United States Patent [19]
Bertacchi

[11] Patent Number: 5,930,698
[45] Date of Patent: Jul. 27, 1999

[54] METHOD AND APPARATUS FOR EFFICIENT LAW ENFORCEMENT AGENCY MONITORING OF TELEPHONE CALLS

[75] Inventor: Luciano Bertacchi, Pierrefonds, Canada

[73] Assignee: Telefonaktiebolaget L M Ericsson (publ), Stockholm, Sweden

[21] Appl. No.: 08/853,433

[22] Filed: May 9, 1997

[51] Int. Cl.[6] .......................... H04M 15/00; H04M 1/24
[52] U.S. Cl. ..................... 455/405; 379/35; 379/142; 379/202
[58] Field of Search ................. 379/35, 133, 134, 379/135, 111, 112, 202, 210, 211, 212, 213, 214, 215, 142; 455/405, 406, 410, 412

[56] References Cited

U.S. PATENT DOCUMENTS

| | | | |
|---|---|---|---|
| 4,309,572 | 1/1982 | Mori et al. | 179/27 FE |
| 4,484,326 | 11/1984 | Turner | 370/60 |
| 4,612,415 | 9/1986 | Zdunek et al. | 179/2 EB |
| 5,195,126 | 3/1993 | Carrier et al. | 379/45 |
| 5,313,654 | 5/1994 | Comroe et al. | 455/33.1 |
| 5,428,667 | 6/1995 | Easterling et al. | 455/410 |
| 5,440,626 | 8/1995 | Boyle et al. | 379/219 |
| 5,469,504 | 11/1995 | Blaha | 379/265 |
| 5,471,519 | 11/1995 | Howe et al. | 379/88.26 |
| 5,473,605 | 12/1995 | Grube et al. | 370/62 |
| 5,590,171 | 12/1996 | Howe et al. | 379/33 |
| 5,655,013 | 8/1997 | Gainsboro | 379/188 |
| 5,757,889 | 5/1998 | Ohtake | 379/34 |
| 5,764,728 | 6/1998 | Ala et al. | 379/35 |

*Primary Examiner*—Reinhard J. Eisenzopf
*Assistant Examiner*—Charles N. Appiah
*Attorney, Agent, or Firm*—Jenkens & Gilchrist

[57] ABSTRACT

Each network handled call, including its original leg and all subsequently initiated related call legs, is assigned a single unique identification number. When a determination is made that the call (including any leg thereof) is to be monitored by a law enforcement agency, a switch handling the call requests a trunk connection from a monitoring center. This request includes the assigned unique identification number. The monitoring center then compares the included identification number with previously received identification numbers associated with active call monitoring operations. If the numbers match, this is indicative of the fact that the call at issue is already being monitored, and the request for a trunk connection is accordingly denied as being redundant. More efficient use of valuable monitoring center communications (trunk) and monitoring (recorder) resources is accordingly made. In a particular embodiment of the present invention, the single unique identification number assigned to a call comprises a cellular telecommunications network assigned billing identification number.

21 Claims, 4 Drawing Sheets

METHOD AND APPARATUS FOR EFFICIENT LAW ENFORCEMENT AGENCY MONITORING OF TELEPHONE CALLS

BACKGROUND OF THE INVENTION

1. Technical Field of the Invention

The present invention relates to telephone networks and, in particular, to the efficient monitoring of telephone calls within such networks by law enforcement agencies.

2. Description of Related Art

It is well known in the art for law enforcement agencies to tap telecommunications trunk connections for the purpose of monitoring voice conversations (calls). Telecommunications switches in the network are programmed with a stored list of telephone numbers assigned to subscribers whose calls are to be monitored. Whenever a switch handles a call connection having a calling party or called party identification number matching a number on the stored list, the switch requests the establishment of a trunk connection (comprising the "tap") with a monitoring center. If the request is granted, a tap trunk connection is established with the monitoring center and then connected (in a manner much like the formation of a conference or three-way call) into the subscriber call connection.

In many situations, switches in the network may attempt to set-up multiple tap connections with the monitoring center for the same call. For example, when the called party number is marked for law enforcement agency monitoring, and the made call to that called party utilizes (i.e., passes through) two different telecommunications switches, each switch involved in the call compares the called number to their stored lists, finds a match, and then requests establishment of a tap trunk connection with the monitoring center. Furthermore, in situations where the parties to a monitored call subsequently initiate a multi-party call (like a conference or three-way call, or a call forward), the switches involved in the various legs of that call find a match and may request the establishment of a tap trunk connection with the monitoring center for multiple ones of the included call legs. Because the communications (trunk) and monitoring (recorder) resources provided by the monitoring center are limited, it is preferred that instances of multiple requests for tap connections and redundant monitoring of the same call be eliminated.

SUMMARY OF THE INVENTION

To address the foregoing problem, the present invention assigns each call, including its original leg and all subsequently initiated related call legs, a single unique identification number. If a switch handling the call determines that the call is to be monitored by a law enforcement agency, a request for a tap trunk connection is made to the monitoring center, with the request relating to an ongoing call monitoring operation including the assigned unique identification number. When the request is received by the monitoring center, a comparison is made to determine whether a prior request has been received having the same identification number. If so, this is indicative of the fact that the call at issue is already being monitored. The request for a tap trunk connection is then accordingly denied as being redundant. If no match is made, the request is granted.

In a particular embodiment of the present invention, the unique identification number assigned to a call being carried by a cellular telecommunications network and included in any request made to the monitoring center comprises the billing identification number which has been assigned by the network to the call for the purpose of tracking calling charges.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
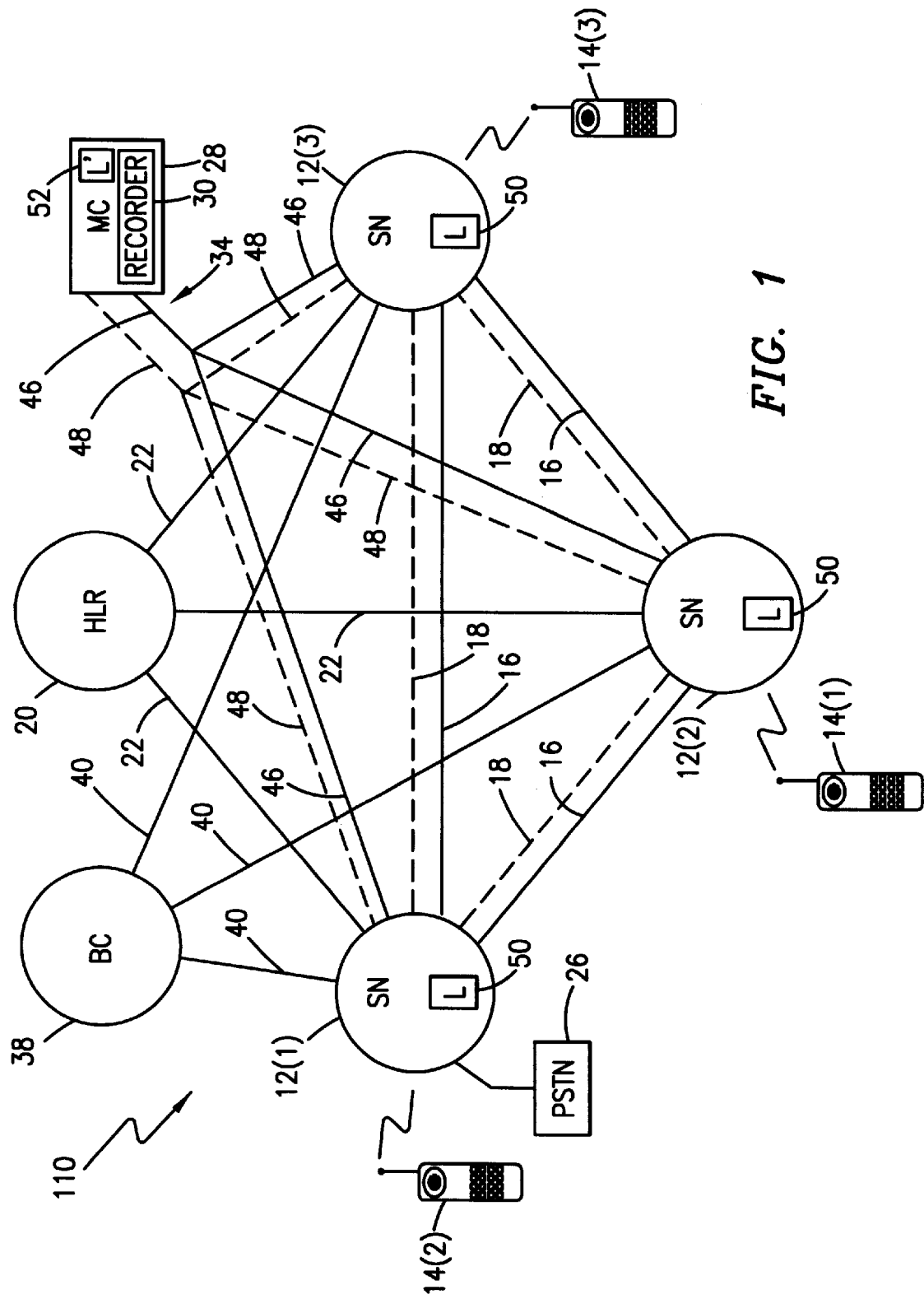
FIG. 1 is a block diagram of a portion of a cellular telephone network providing for law enforcement agency monitoring of cellular calls.

Reference is now made to FIG. 1 wherein there is shown a block diagram of a portion of a cellular telephone network 10 including a plurality of interconnected switching nodes (SN) 12. Although only three switching nodes 12 are shown, it will be understood that the network 10 likely includes many more interconnected nodes. The switching nodes 12 may comprise any one of a number of known telecommunications switching devices, including those commonly used and known in the art for providing either digital or analog cellular telephone service to a plurality of mobile station subscribers 14. The switching nodes 12 are interconnected for communication via both signaling links 16 (illustrated with solid lines) and voice trunks 18 (illustrated with broken lines). The voice trunks 18 provide plural voice and data communications paths used to carry mobile subscriber station 14 communications between the nodes 12. The signaling links 16 carry network communications signals between the nodes 12 that are used for controlling network operation. The switching nodes 12 are connected to a home location register (HLR) data base 20 by means of signaling links 22 (again illustrated with solid lines). The home location register 20 stores information concerning the subscriber mobile stations 14 such as location information.

The network 10 further includes a billing center (BC) 38 connected to the switching nodes 12 via signaling links 40 (again illustrated with solid lines). As a cellular telephone call is routed through the network 10 during call set-up, and thereafter handled, each switching node 12 involved in the call generates one or more toll tickets (TTs) containing charging data relating to the ongoing cellular call. This charging data includes details concerning the call including, if available, an identification of the calling and called parties, party location information, routing information, switching information, and other call related information. In order to differentiate between the many cellular calls being handled, and to properly charge for each individual cellular telephone call with respect to all of its included legs, the network assigns each call a unique billing identification number (B-ID). This billing identification number is provided along with the charging information in each toll ticket report sent by a switching node 12 to the billing center 38.

Law enforcement agencies are often authorized to monitor cellular telephone calls to obtain evidence for use in criminal investigations. To accomplish this goal, a monitoring center (MC) 28 is established which may include one or more tape recorders 30 for recording the voice conversation that is being monitored. The physical connection with the voice portion of the cellular telephone network 10 which enables monitoring is made through a tap (generally shown at 34) comprising a signaling link 46 (illustrated with a solid line) and a voice trunk 48 (illustrated with a broken line). The voice trunks 48 provide plural voice and data communications paths used to carry mobile subscriber station 14 communications to the monitoring center 28 and the recorders 30 therein. The signaling links 46 carry network communications signals between the switching nodes 12 and the monitoring center 28 that are used for requesting and setting up trunk connections for the tap 34. The tap 34 may be made at any location within the cellular telephone network 10 in a manner well known to those skilled in the art, but is typically made through a requesting one or ones of the switching nodes 12 where the subscriber to be monitored is currently located (roaming). The law enforcement agency monitoring center 28 utilizes the tap 34 (and in particular one of the trunks 48 thereof) to monitor the voice communication (which may be recorded by tape recorder 30 for future use).

Each switching node 12 is programmed with a stored list (L) 50 of directory numbers for those subscribers whose calls are to be monitored by a law enforcement agency. When a switching node 12 handles a leg of a call and can match a calling or called party identification associated with that leg to an entry on the stored list 50, the switch transmits a request for a tap trunk connection to the monitoring center 28. The request signal includes as one its parameters the billing identification number (BID) assigned by the network to the call. The monitoring center 28 maintains a stored list (L') 52 of billing identification numbers assigned to each call that it is currently monitoring. The billing identification number received in the request signal is then compared to the numbers contained in the stored list 52. If there is a match, this is indicative of the fact that the call is already being monitored and the request for a tap trunk connection is accordingly denied as being redundant. Otherwise, the request is granted, a tap trunk connection 34 with the monitoring center 28 is assigned, connected into the call by the switching node 12, and the call is monitored (recorded).

Figure 2:
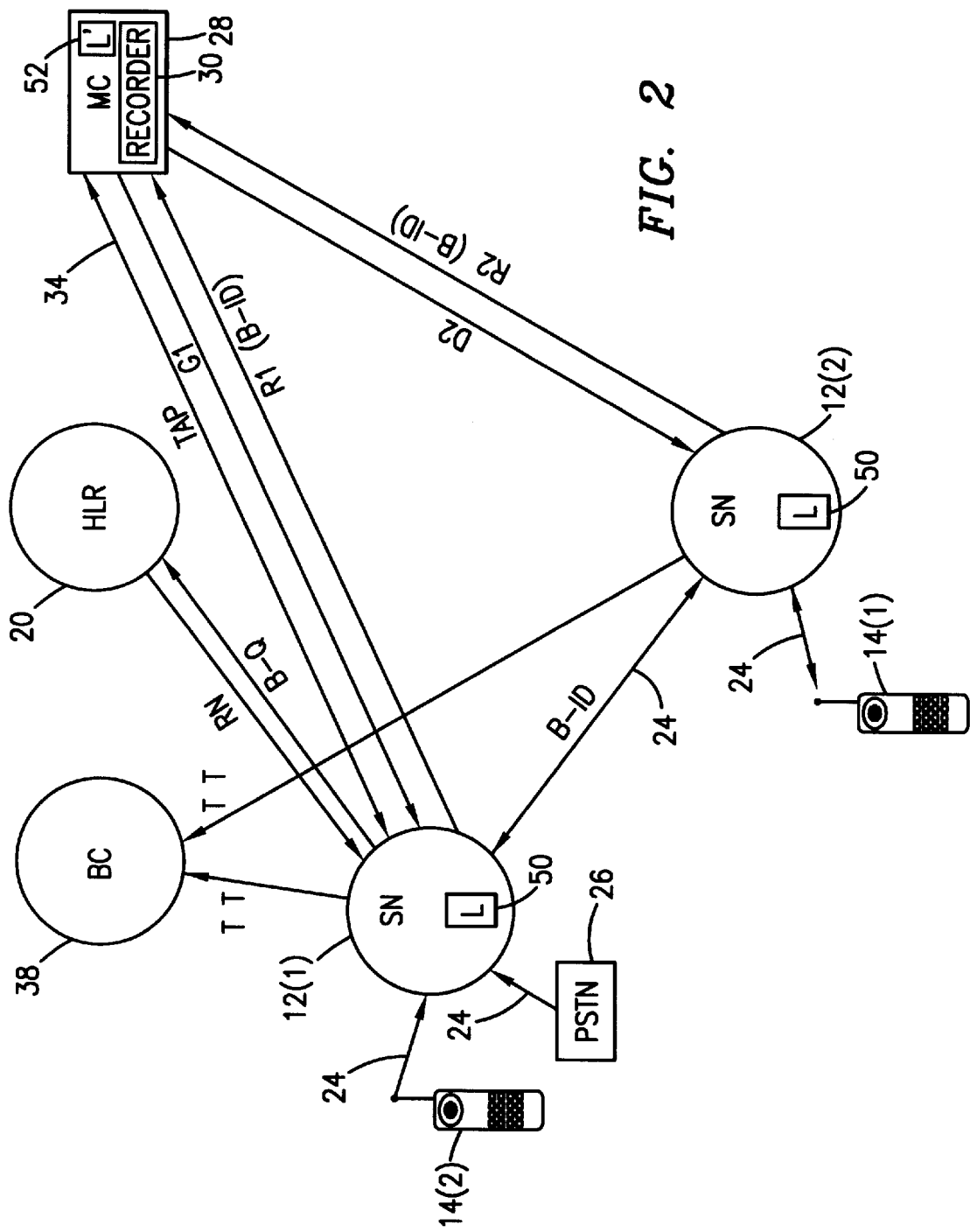
FIG. 2 is a block diagram of a portion of a cellular telephone network as in FIG. 1 illustrating the flow of signals in connection with law enforcement agency monitoring of a multi-node handled cellular call.

Reference is now made to FIG. 2 wherein there is shown a block diagram of a portion of a cellular telephone network 10 as in FIG. 1 illustrating the flow of signals in connection with law enforcement agency monitoring of a multi-node handled cellular call. Like reference numbers and designations in FIGS. 1 and 2 refer to like or similar network components.

Assume now that a cellular call originates, as generally indicated at 24, with a calling party (A-party) who may comprise either another cellular subscriber (e.g., mobile station 14(2)) of the cellular telephone network 10, or a wireline subscriber (not shown) within the public switched telephone network (PSTN) 26. That call 24 is further assumed to have been dialed to the directory telephone number (B-number) of a called mobile station subscriber 14(1). Following receipt of the call 24 in an originating (gateway) switching node 12(1) of the cellular network 10, the home location register data base 20 is queried with the dialed B-number to determine called subscriber location (signal B-Q). Responsive to the query, well known network signaling occurs (not shown), and the data base 20 returns a roamer number (signal RN) identifying the switching node 12(2) that currently serves the called mobile station subscriber 14(1). The returned roamer number is then used by the originating switching node 12(1) to route the cellular call 24 to the serving switching node 12(2), with the dialed B-number (B) then used to deliver the call 24 to the mobile station subscriber 14(1). The call 24 is further assigned a billing identification number (B-ID), and the various switching nodes 12 implicated in making the call connection to the called mobile station subscriber 14(1) send toll tickets (TTs) to the billing center 38 for that call.

Assume further that the dialed B-number is associated with a subscriber whose calls are to be monitored by a law enforcement agency. Accordingly, the B-number is an entry in the stored list 50 maintained by the switching nodes 12. Responsive to the incoming call 24, the switching node 12(1) compares the dialed B-number to its stored list 50, and notes a match. A trunk request (signal R1) is then sent to the monitoring center 28. This request signal R1 includes as one of its parameters the billing identification number (B-ID) assigned by the network to the call 24. The monitoring center 28 compares the included billing identification number to its stored list 52 of numbers for currently monitored calls, and finds no match. Accordingly, the request is granted (signal G1). A tap trunk connection 34 is then established with switching node 12(1) and connected (in the manner of a conference or three-way call) by the switching node into the call 24. The stored list 52 is further updated by the monitoring center 28 to include the transmitted billing identification number for the call 24 which is now being monitored.

When the returned roamer number (RN) is used by the originating switching node 12(1) to route the cellular call to the serving switching node 12(2), the serving switching node 12(2) compares the dialed B-number to its stored list 50, and also notes a match. A trunk request (signal R2) is then sent to the monitoring center 28. This request signal R2 similarly includes as one of its parameters the billing identification number (B-ID) assigned by the network to the call 24. The monitoring center 28 compares the included billing identification number to its stored list 52 of number for currently monitored calls, and finds a match. This is indicative of the fact that the call 24 at issue is already being monitored (see, tap connection 34). The request for a trunk connection is accordingly denied (signal D2) as being redundant.

Figure 3:
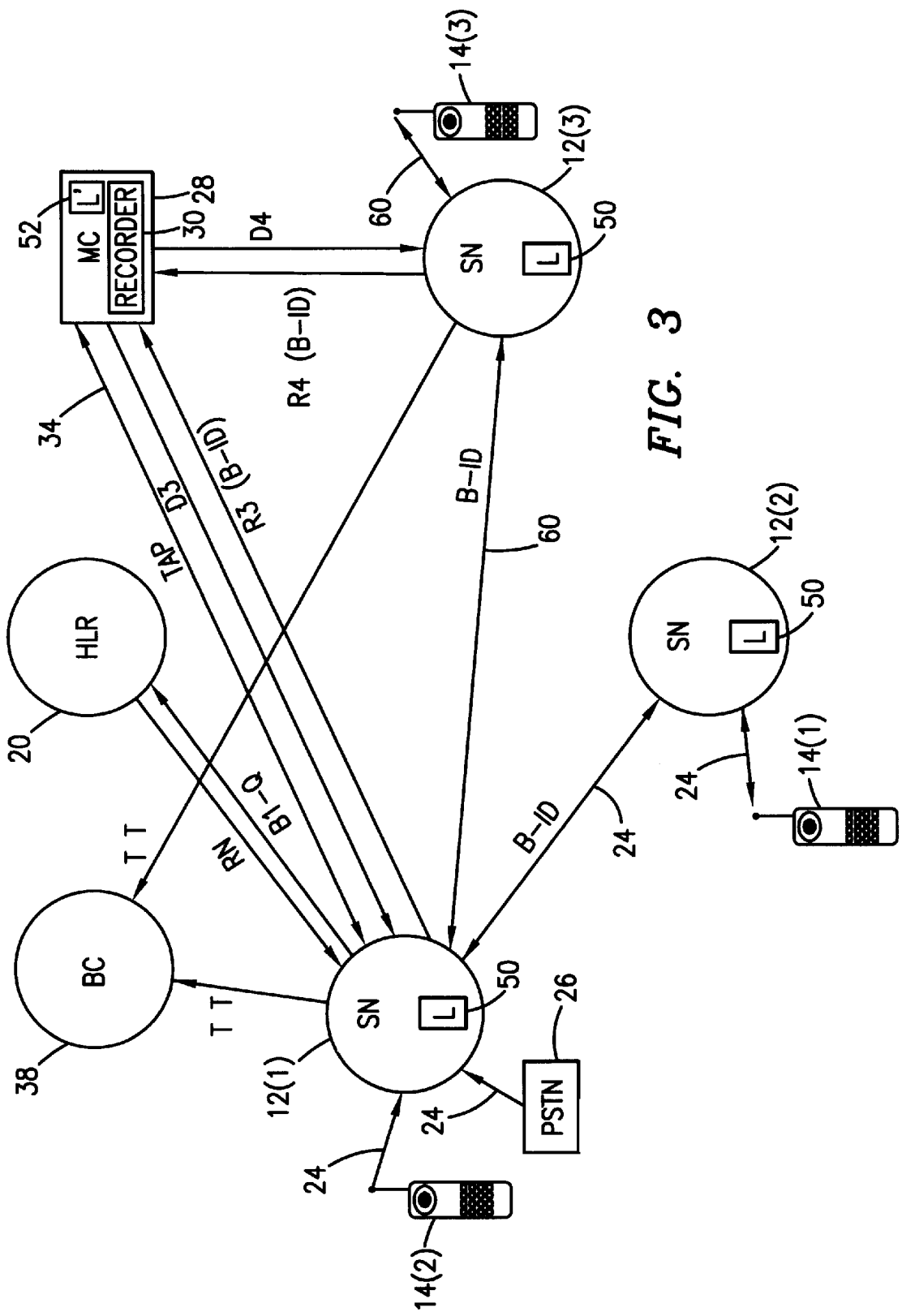
FIG. 3 is a block diagram of a portion of a cellular telephone network as in FIG. 1 illustrating the flow of signals in connection with law enforcement agency monitoring of a multi-party conference or three-way cellular call.

Reference is now made to FIG. 3 wherein there is shown a block diagram of a portion of a cellular telephone network 10 as in FIG. 1 illustrating the flow of signals in connection with law enforcement agency monitoring of a multi-party conference or three-way cellular call. Like reference numbers and designations in FIGS. 1 and 3 refer to like or similar network components. In connection with FIG. 3, it is assumed that the call 24 between the A-party and monitored B-party and tap connection 34 of FIG. 2 have already been established.

Assume now that the A-party to the call 24 desires to initiate a multi-party three-way or conference call with a mobile station subscriber 14(3) having a certain assigned directory number (B1-number). Appropriate signaling is initiated by the A-party and received at originating switching node 12(1). Responsive thereto, switching node 12(1) queries the home location register data base 20 with the identified B1-number to determine called subscriber location (signal B1-Q). Responsive to the query, the data base 20 returns a roamer number (signal RN) identifying the switching node 12(3) currently serving that mobile station subscriber 14(3). The returned roamer number is then used by the originating switching node 12(1) to establish a call connection 60 with the serving switching node 12(3), with the identified B1-number then used to deliver the call to the mobile station subscriber 14(3). This call connection 60 is assigned the same billing identification number (B-ID) as the call 24, and appropriate toll tickets (TTs) relating thereto are sent by the switching nodes 12 to the billing center 38. The originating switching node 12(1) then connects the new call connection 60 into the original call 24 to create the conference or three-way call between the A-party, B-party and B1-party.

Assume further that the identified B1-number is associated with a subscriber whose calls are to be monitored by a law enforcement agency. When the multi-party call request with respect to the B1-party is initiated, the originating switching node 12(1) compares the identified B1-number to its stored list 50, and notes a match. A trunk request (signal R3) is then sent to the monitoring center 28. This request signal R3 again includes as one of its parameters the billing identification number (B-ID) assigned by the network to the conference call 24/60. The monitoring center 28 compares the included billing identification number to its stored list 52 of numbers for currently monitored calls, and finds a match. This is indicative of the fact that the conference call 24/60 at issue is already being monitored through the tap 34 originating switching node 12(1) established when the call 24 was originated (see, FIG. 2). The request for a trunk connection is accordingly denied (signal D3) as being redundant.

When the returned roamer number (RN) is used by the originating switching node 12(1) to establish the call connection 60 to the serving switching node 12(3), the serving switching node 12(3) compares the identified B1-number to its stored list 50, and also notes a match. A trunk request (signal R4) is then sent to the monitoring center 28. This request signal R4 again includes as one of its parameters the billing identification number (B-ID) assigned by the network to the conference call 24/60. The monitoring center 28 compares the included billing identification numbers to its stored list 52 of number for currently monitored calls, and finds a match. This is indicative of the fact that the conference call 24/60 at issue is already being monitored through the tap 34 originating switching node 12(1) established when the call 24 was originated (see, FIG. 2). The request for a trunk connection is accordingly denied (signal D4) as being redundant.

Figure 4:
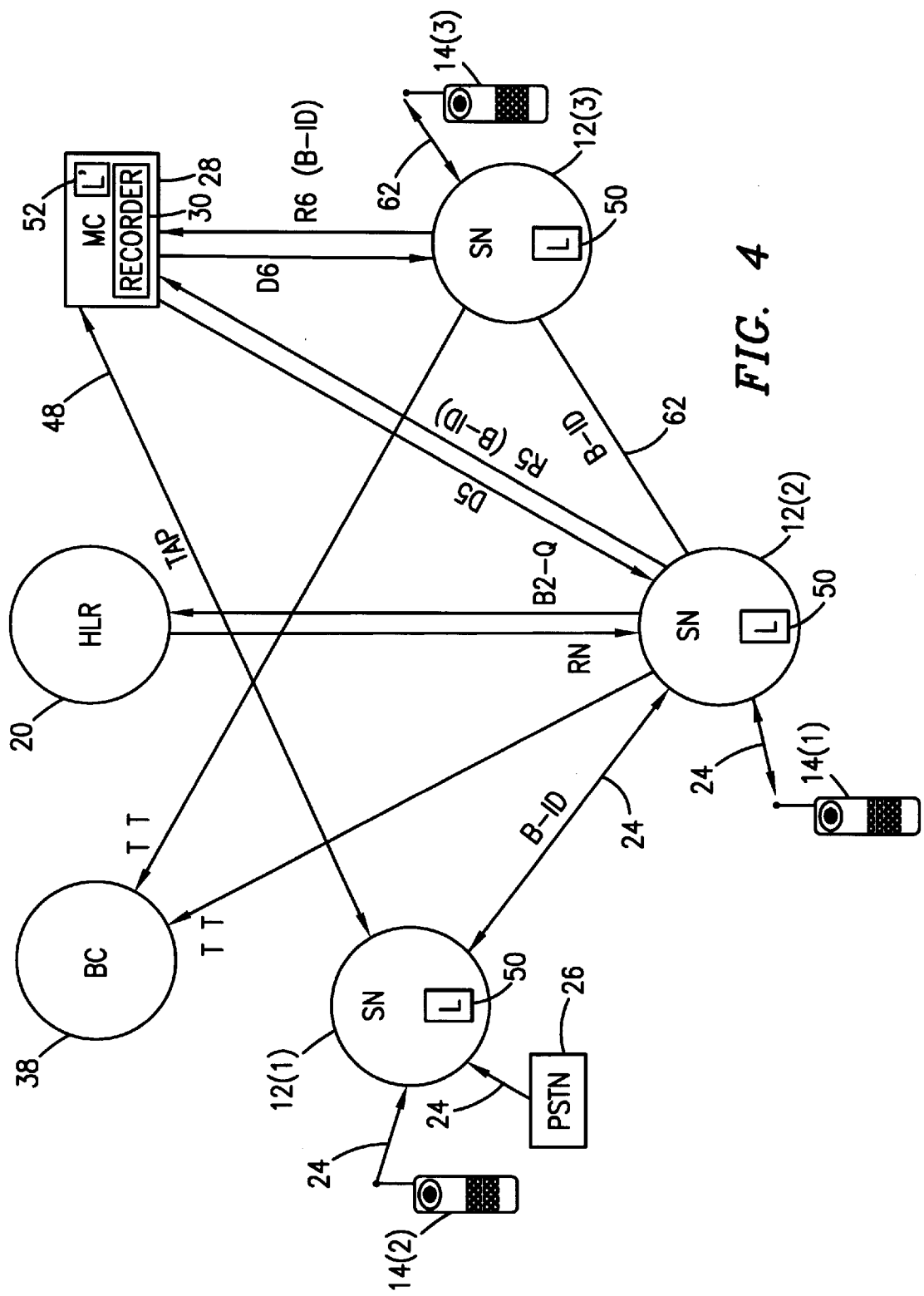
FIG. 4 is a block diagram of a portion of a cellular telephone network as in FIG. 1 illustrating the flow of signals in connection with law enforcement agency monitoring of a multi-party call forwarded cellular call.

Reference is now made to FIG. 4 wherein there is shown a block diagram of a portion of a cellular telephone network 10 as in FIG. 1 illustrating the flow of signals in connection with law enforcement agency monitoring of a multi-part call forwarded cellular call. Like reference numbers and designations in FIGS. 1 and 4 refer to like or similar network components. In connection with FIG. 4, it is assumed that the call 24 between the A-party and monitored B-party and tap connection 34 of FIG. 2 have already been established.

Assume now that the B-party to the call 24 desires to initiate a multi-party call forwarded call to a mobile station subscriber 14(4) having a certain assigned directory number (B2-number). Appropriate signaling is initiated by the B-party and received at originating switching node 12(1) (for call forwarding on command). Alternatively, the forwarding operation is automatically initiated by the serving switching node 12(2) (for call forwarding automatic, on busy, or no answer, as appropriate). Responsive thereto, switching node 12(2) queries the home location register data base 20 with the identified B2-number to determine called subscriber location (signal B2-Q). Responsive to the query, the data base 20 returns a roamer number (signal RN) identifying the switching node 12(3) currently serving that mobile station subscriber 14(4). The returned roamer number is then used by the serving switching node 12(2) to establish a call connection 62 with the serving switching node 12(3), with the identified B2-number then used to deliver the call to the mobile station subscriber 14(4). This call connection 60 is assigned the same billing identification number (BID) as the call 24, and appropriate toll tickets (TTs) relating thereto are sent by the switching nodes 12 to the billing center 38. The serving switching node 12(1) then routes the cellular call 24 to the serving switching node 12(3) over forwarded connection 62, with the identified B2-number used to deliver the forwarded call to the mobile station subscriber 14(4).

Assume further that the identified B2-number is associated with a subscriber whose calls are to be monitored by a law enforcement agency. When the multi-party call request with respect to the B2-party is initiated, the switching node 12(2) compares the identified B2-number to its stored list 50, and notes a match. A trunk request (signal R5) is then sent to the monitoring center 28. This request signal R5 again includes as one of its parameters the billing identification number (B-ID) assigned by the network to the forwarded call 24/62. The monitoring center 28 compares the included billing identification numbers to its stored list 52 of number for currently monitored calls, and finds a match. This is indicative of the fact that the forwarded call 24/62 at issue is already being monitored through the tap 34 originating switching node 12(1) established when the call 24 was originated (see, FIG. 2). The request for a trunk connection is accordingly denied (signal D5) as being redundant.

When the returned roamer number (RN) is used by the switching node 12(2) to route the call 24 over call connection 62 to the serving switching node 12(3), the serving switching node 12(3) compares the identified B2-number to its stored list 50, and also notes a match. A trunk request (signal R6) is then sent to the monitoring center 28. This request signal R6 again includes as one of its parameters the billing identification number (B-ID) assigned by the network to the forwarded call 24/62. The monitoring center 28 compares the included billing identification number to its stored list 52 of numbers for currently monitored calls, and finds a match. This is indicative of the fact that the forwarded call 24/62 at issue is already being monitored through the tap 34 originating switching node 12(1) established when the call 24 was originated (see, FIG. 2). The request for a trunk connection is accordingly denied (signal D6) as being redundant.

Although disclosed specifically in the context of a cellular telephone network using the network assigned billing identification number (B-ID), it will be understood that present invention is equally applicable in other types of communications networks (such as a wireline network) where a unique identification number is or may be assigned to a call (including each of its associated calling legs). Thus, the unique identification number (such as a billing identification number) for a call would be included or incorporated within, for example, an Initial Address Message (IAM) as defined in ANSI SS7 ISUP and CCITT C7 ISUP/TUP digital network protocols, a General Setup Message as defined in the CCITT C7 TUP digital network protocol, appropriate signals of the R1 CAMA/FgD and R2 MFC analog multi-tone protocols, and appropriate signals of the TIA/EIA Interim Standard IS-41 mobile network signaling protocol.

Furthermore, although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for notifying a law enforcement agency monitoring center as to the possible monitoring of a multi-leg telephone call, comprising the steps of:
    assigning a single unique identification number for that telephone call, inclusive of each of its included legs;
    determining for each of the included legs whether a party to the multi-leg telephone call has been identified by the law enforcement agency as a party whose calls are to be monitored; and
    sending a request for a trunk connection to the law enforcement agency monitoring center for each leg in which a party to the multi-leg telephone call has been identified as a party whose calls are to be monitored, the sent request including the assigned single unique identification number for that multi-leg telephone call.

2. The method as in claim 1 further including the step of waiting for a response from the law enforcement agency monitoring center to the sent request.

3. The method as in claim 2 further including the step of establishing, in response to a granting of the request, a connection between a tap connection assigned by the law enforcement agency monitoring center and the multi-leg telephone call to enable monitoring of the multi-leg telephone call to occur.

4. The method as in claim 1 further including the steps of:
    processing, by the law enforcement agency monitoring center, of the assigned single unique identification number included in each request to determine whether a prior request relating to an ongoing call monitoring operation was made with a matching identification number; and
    if so, denying the request; and
    otherwise, granting the request.

5. The method as in claim 1 wherein the multi-leg telephone call comprises a cellular telephone call, and the single unique identification number for the multi-leg telephone call comprises a billing identification number assigned to the cellular telephone call.

6. The method as in claim 1 wherein the multi-leg telephone call, with its included legs, comprises a multi-party conference or three-way telephone call.

7. The method as in claim 1 wherein the multi-leg telephone call, with its included legs, comprises a multi-party call forwarded telephone call.

8. The method as in claim 1 wherein the multi-leg telephone call, with its included legs, comprises a a first leg between an A-party and a B-party, and a second leg from either the A-party or the B-party.

9. A method for responding to a tap connection request for the monitoring of a multi-leg telephone call, wherein the multi-leg telephone call, inclusive of each of its included legs, is assigned a single unique identification number, comprising the steps of:
    receiving a request for a tap connection from a switching node handling a leg of the multi-leg telephone call, the request including the assigned single unique identification number for the multi-leg telephone call;
    processing of the assigned single unique identification number included in the received request to determine whether a prior request relating to an ongoing call monitoring operation was made with a matching identification number; and
    if so, denying the request; and
    otherwise, granting the request.

10. The method as in claim 9 wherein the multi-leg telephone call, with its included legs, comprises a multi-party conference or three-way telephone call.

11. The method as in claim 9 wherein the multi-leg telephone call, with its included legs, comprises a multi-party call forwarded telephone call.

12. The method as in claim 9 wherein the multi-leg telephone call, with its included legs, comprises a first leg between an A-party and a B-party, and a second leg from either the A-party or the B-party.

13. The method as in claim 9 wherein the multi-leg telephone call comprises a cellular telephone call, and the single unique identification number for the telephone call comprises a billing identification number assigned to the cellular telephone call.

14. The method as in claim 9 further including the step of establishing, in response to a granting of the request, a connection between a tap connection assigned by the law enforcement agency monitoring center as the tap connection and the multi-leg telephone call to enable monitoring of the multi-leg telephone call to occur.

15. A system for efficiently monitoring telephone calls, comprising:
    a switching node handling a multi-leg telephone call, wherein the multi-leg telephone call, inclusive of each of its included legs, is assigned a single unique identification number, the switching node operating to determine whether a party to the multi-leg telephone call has been identified by a law enforcement agency as a party whose calls are to be monitored, and further operating in affirmative response thereto to generate a request for a tap connection, the request including the assigned single unique identification number; and a monitoring center connected to the switching node to receive the request and operating, in response thereto, to determine whether a prior request relating to an ongoing call monitoring operation was received with a matching identification number, and further operating to deny the request for a tap connection if there is a match.

16. The system as in claim 15, the monitoring center further operating to grant, of there is no match, the establishment of a tap connection between the switching node and the monitoring center to enable monitoring of the multi-leg telephone call to occur.

17. The system as in claim 16, the switching node further operating, in response to the establishment of the tap connection, to connect the tap connection into the multi-leg telephone call.

18. The system as in claim 15 wherein the multi-leg telephone call, with its included legs, comprises a multi-party conference or three-way telephone call.

19. The system as in claim 15 wherein the multi-leg telephone call, with its included legs, comprises a multi-party call forwarded telephone call.

20. The system as in claim 15 wherein the multi-leg telephone call, with its included legs, comprises a first leg between an A-party and a B-party, and a second leg from either the A-party or the B-party.

21. The system as in claim 15 wherein the multi-leg telephone call comprises a cellular telephone call, and the single unique identification number for the telephone call comprises a billing identification number assigned to the cellular telephone call.

* * * * *

UNITED STATES PATENT AND TRADEMARK OFFICE
CERTIFICATE OF CORRECTION

PATENT NO. : 5,930,698  
DATED : July 27, 1999  
INVENTOR(S) : Luciano Bertacchi Page 1 of 1

It is certified that error appears in the above-identified patent and that said Letters Patent is hereby corrected as shown below:

Title page,
Item [56], insert:
-- U.S Patent Documents
5,063,591     11/1991     Jodoin Foreign Patent Documents
WO 97/42784   11/1997     WIPO
DE 197 26 292            Germany
Other Documents PCT Standard Search Report, September 4, 1998,
PCT/SE98/00804
Yen et al., "Intelligent MTS Monitoring System",
October 12, 1994, 1994 IEEE, pages 185-187 --

Column 3,
Line 41, delete "BID" replace with -- B-ID --

Column 6,
Line 32, delete "BID" repalce with -- B-ID --

Signed and Sealed this

Twenty-seventh Day of November, 2001

Attest:

NICHOLAS P. GODICI  
*Attesting Officer*     *Acting Director of the United States Patent and Trademark Office*